(12) United States Patent
Kim

(10) Patent No.: US 11,732,128 B2
(45) Date of Patent: Aug. 22, 2023

(54) THERMOPLASTIC POLYCARBONATE RESIN COMPOSITION AND MOLDED PRODUCT FORMED THEREFROM

(71) Applicant: LOTTE CHEMICAL CORPORATION, Seoul (KR)

(72) Inventor: Myeong Hwan Kim, Uiwang-si (KR)

(73) Assignee: Lotte Chemical Corporation, Seoul (KR)

( * ) Notice: Subject to any disclaimer, the term of this patent is extended or adjusted under 35 U.S.C. 154(b) by 289 days.

(21) Appl. No.: 16/764,097

(22) PCT Filed: Dec. 28, 2018

(86) PCT No.: PCT/KR2018/016852
§ 371 (c)(1),
(2) Date: May 14, 2020

(87) PCT Pub. No.: WO2019/132584
PCT Pub. Date: Jul. 4, 2019

(65) Prior Publication Data
US 2020/0283624 A1 Sep. 10, 2020

(30) Foreign Application Priority Data
Dec. 29, 2017 (KR) .......................... 10-2017-0184308

(51) Int. Cl.
*C08L 69/00* (2006.01)
*C08L 51/04* (2006.01)
*C08L 55/02* (2006.01)
*C08K 5/523* (2006.01)

(52) U.S. Cl.
CPC .............. *C08L 69/00* (2013.01); *C08L 51/04* (2013.01); *C08L 55/02* (2013.01); *C08L 2201/02* (2013.01); *C08L 2205/025* (2013.01); *C08L 2205/035* (2013.01); *C08L 2207/53* (2013.01)

(58) Field of Classification Search
None
See application file for complete search history.

(56) References Cited

U.S. PATENT DOCUMENTS

| | | | | |
|---|---|---|---|---|
| 4,788,250 | A * | 11/1988 | Kitahara | ............... C08L 101/00 525/73 |
| 6,180,701 | B1 * | 1/2001 | Takemura | ............... C08L 69/00 524/238 |
| 9,458,315 | B2 | 10/2016 | Li et al. | |
| 2007/0093591 | A1 | 4/2007 | Ma et al. | |
| 2009/0203831 | A1 * | 8/2009 | Ma | .......................... C08L 69/00 524/502 |
| 2009/0215949 | A1 | 8/2009 | Fujiguchi et al. | |
| 2011/0052895 | A1 | 3/2011 | Li et al. | |
| 2011/0077332 | A1 * | 3/2011 | Tomoda | .................. C08L 69/00 524/508 |
| 2015/0099845 | A1 | 4/2015 | Daga et al. | |
| 2015/0274966 | A1 * | 10/2015 | Zhu | ........................... C08J 5/00 524/508 |
| 2016/0355678 | A1 * | 12/2016 | Murakami | ............. C08K 5/523 |
| 2017/0275444 | A1 * | 9/2017 | Sohn | ....................... C08L 67/02 |

FOREIGN PATENT DOCUMENTS

| | | | |
|---|---|---|---|
| CN | 103275476 | * | 9/2013 |
| CN | 106751662 | * | 5/2017 |
| EP | 0899303 A2 | | 3/1999 |
| JP | 11-140296 A | | 5/1999 |
| KR | 10-1480180 B1 | | 1/2015 |
| KR | 10-2015-0098516 A | | 8/2015 |
| KR | 10-2016-0077081 A | | 7/2016 |
| KR | 10-2017-0011459 A | | 2/2017 |
| KR | 10-1751870 B1 | | 6/2017 |
| WO | 2007/050412 A1 | | 5/2007 |
| WO | 2009/104120 A1 | | 8/2009 |
| WO | 2013/100303 A1 | | 7/2013 |
| WO | 2019/132584 A1 | | 7/2019 |

OTHER PUBLICATIONS

Shine Polymer SN3300B7 anti-dripping agent brochure (2016) pp. 1-2. (Year: 2016).*
OceanChem PX220 data sheet (no date). (Year: 0000).*
International Search Report in counterpart International Application No. PCT/KR2018/016852 dated Apr. 9, 2019, pp. 1-4.
Search Report in counterpart European Application No. 18895354.1 dated Oct. 12, 2021, pp. 1-6.

* cited by examiner

*Primary Examiner* — David J Buttner
(74) *Attorney, Agent, or Firm* — Addition, Pendleton & Witherspoon, P.A.

(57) ABSTRACT

A thermoplastic resin composition of the present invention comprises: approximately 100 parts by weight of a polycarbonate resin; approximately 1-10 parts by weight of a first rubber-modified vinyl-based graft copolymer in which a monomer mixture comprising an aromatic vinyl-based monomer and a cyanovinyl-based monomer is graft-polymerized onto a rubbery polymer; approximately 1-10 parts by weight of a second rubber-modified vinyl-based graft copolymer in which an alkyl (meth)acrylate-based monomer is graft-polymerized onto a rubbery polymer; approximately 1-30 parts by weight of a phosphorus flame retardant; and approximately 0.1-5 parts by weight of an encapsulated fluoropolymer. The thermoplastic resin composition has excellent impact resistance, thin film flame retardancy, heat resistance, flowability and the like.

5 Claims, No Drawings

THERMOPLASTIC POLYCARBONATE RESIN COMPOSITION AND MOLDED PRODUCT FORMED THEREFROM

CROSS-REFERENCE TO RELATED APPLICATIONS

This application claims priority to and the benefit of International Application No. PCT/KR2018/016852, filed Dec. 28, 2018, which published as WO 2019/132584 on Jul. 4, 2019, and Korean Patent Application No. 10-2017-0184308, filed in the Korean Intellectual Property Office on Dec. 29, 2017, the entire disclosure of each of which is incorporated herein by reference.

TECHNICAL FIELD

The present invention relates to a thermoplastic resin composition and a molded product formed therefrom. More particularly, the present invention relates to a thermoplastic resin composition which has good properties in terms of impact resistance, thin film flame retardancy, heat resistance, flowability, and the like, and a molded product formed therefrom.

BACKGROUND ART

Among thermoplastic resin compositions, a PC/ABS-based flame retardant thermoplastic resin composition prepared by blending a polycarbonate (PC) resin with a flame retardant and a rubber-modified aromatic vinyl copolymer resin, such as an acrylonitrile-butadiene-styrene (ABS) copolymer resin, is broadly used in various fields including interior/exterior materials of electrical/electronic products, industrial components, daily necessities, and automotive materials. As compared with general plastic materials, such a flame retardant thermoplastic resin composition has good properties in terms of impact resistance, flame retardancy, flowability, and the like, and has an advantage of allowing easy adjustment of properties thereof during processing. Typically, the properties of the flame retardant thermoplastic resin composition are adjusted through change of a melt mixing ratio, a composition ratio of polymerization monomers, molecular weights, and the like.

Due to recent issues of environment and energy, eco-friendly design of plastic products is emphasized and design of products gradually becomes lighter and thinner. Accordingly, there is increasing demand for development of novel materials capable of simultaneously exhibiting high impact resistance, high flowability and high thin film flame retardancy that are difficult for products formed of typical flame retardant thermoplastic resin compositions to realize.

Therefore, there is a need for development of a thermoplastic resin composition that has good properties in terms of impact resistance, thin film flame retardancy, heat resistance, flowability, balance therebetween, and the like.

The background technique of the present invention is disclosed in Korean Patent Laid-open Publication No. 10-2016-0077081 and the like.

DISCLOSURE

Technical Problem

It is one aspect of the present invention to provide a thermoplastic resin composition which has good properties in terms of impact resistance, thin film flame retardancy, heat resistance, flowability, and the like.

It is another aspect of the present invention to provide a molded product formed of the thermoplastic resin composition.

The above and other aspects of the present invention can be achieved by the present invention described below.

Technical Solution

1. One aspect of the present invention relates to a thermoplastic resin composition. The thermoplastic resin composition includes: about 100 parts by weight of a polycarbonate resin; about 1 part by weight to about 10 parts by weight of a first rubber-modified vinyl graft copolymer obtained through graft polymerization of a monomer mixture including an aromatic vinyl monomer and a vinyl cyanide monomer to a rubber polymer; about 1 part by weight to about 10 parts by weight of a second rubber-modified vinyl graft copolymer obtained through graft polymerization of an alkyl (meth)acrylate monomer to a rubber polymer; about 1 part by weight to about 30 parts by weight of a phosphorus flame retardant; and about 0.1 parts by weight to about 5 parts by weight of a capsulated fluorine polymer.

2. In Embodiment 1, the first rubber-modified vinyl graft copolymer and the second rubber-modified vinyl graft copolymer may be present in a weight ratio of about 1:1 to about 1:3.

3. In Embodiment 1 or 2, the second rubber-modified vinyl graft copolymer may be obtained through graft polymerization of a monomer mixture including the alkyl (meth)acrylate monomer and an aromatic vinyl monomer to the rubber polymer.

4. In Embodiments 1 to 3, the phosphorus flame retardant may include at least one of a phosphate compound, a phosphonate compound, a phosphinate compound, a phosphine oxide compound, and a phosphazene compound.

5. In Embodiments 1 to 4, the phosphorus flame retardant may be a hydroquinone bis(diphenyl phosphate).

6. In Embodiments 1 to 5, the capsulated fluorine polymer may be polytetrafluoroethylene capsulated with a polymer of styrene and acrylonitrile.

7. In Embodiments 1 to 6, the thermoplastic resin composition may have a notched Izod impact strength of about 45 kgf·cm/cm to about 80 kgf·cm/cm, as measured on a ⅛" thick specimen in accordance with ASTM D256.

8. In Embodiments 1 to 7, the thermoplastic resin composition may have a flame retardancy of V-0 or higher, as measured on a 1.2 mm thick specimen by a UL-94 vertical test method.

9. In Embodiments 1 to 8, the thermoplastic resin composition may have a flame retardancy of 5VA, as measured on a 2.5 mm thick specimen by a UL-94 vertical test method.

10. In Embodiments 1 to 9, the thermoplastic resin composition may have a Vicat softening temperature of about 90° C. to about 120° C., as measured under conditions of a load of 5 kg and 50° C./hr in accordance with ISO R306.

11. In Embodiments 1 to 10, the thermoplastic resin composition may have a melt-flow index (MI) of about 20 g/10 min to about 50 g/10 min, as measured under conditions of 220° C. and 10 kgf in accordance with ASTM D1238.

12. Another aspect of the present invention relates to a molded product. The molded product is formed of the thermoplastic resin composition according to any one of Embodiments 1 to 11.

Advantageous Effects

The present invention provides a thermoplastic resin composition which has good properties in terms of impact resistance, thin film flame retardancy, heat resistance, flowability, and the like, and a molded product formed of the same.

BEST MODE

Hereinafter, embodiments of the present invention will be described in detail.

A thermoplastic resin composition according to the present invention includes: (A) a polycarbonate resin; (B) a first rubber-modified vinyl graft copolymer; (C) a second rubber-modified vinyl graft copolymer; (D) a phosphorus flame retardant; and (E) a capsulated fluorine polymer.

As used herein to represent a specific numerical range, the expression "a to b" means "≥a and ≤b".

(A) Polycarbonate Resin

The polycarbonate resin according to one embodiment of the invention may include any typical polycarbonate resin used in thermoplastic resin compositions. For example, the polycarbonate resin may be an aromatic polycarbonate resin prepared by reacting diphenols (aromatic diol compounds) with a precursor, such as phosgene, halogen formate, or carbonate diester.

In some embodiments, the diphenols may include, for example, 4,4'-biphenol, 2,2-bis(4-hydroxyphenyl)-propane, 2,4-bis(4-hydroxyphenyl)-2-methylbutane, 1,1-bis(4-hydroxyphenyl)cyclohexane, 2,2-bis(3-chloro-4-hydroxyphenyl)propane, 2,2-bis-(3,5-dichloro-4-hydroxyphenyl)propane, 2,2-bis(3-methyl-4-hydroxyphenyl)propane, and 2,2-bis(3,5-dimethyl-4-hydroxyphenyl)propane, without being limited thereto. For example, the diphenols may be 2,2-bis(4-hydroxyphenyl)propane, 2,2-bis(3,5-dichloro-4-hydroxyphenyl)propane, 2,2-bis(3-methyl-4-hydroxyphenyl)propane or 1,1-bis(4-hydroxyphenyl)cyclohexane, specifically 2,2-bis(4-hydroxyphenyl)propane, which is also referred to as bisphenol-A.

In some embodiments, the polycarbonate resin may be a branched polycarbonate resin. For example, the polycarbonate resin may be a polycarbonate resin prepared by adding a tri- or higher polyfunctional compound, specifically, a tri- or higher valent phenol group-containing compound, in an amount of about 0.05 mol % to about 2 mol % based on the total number of moles of the diphenols used in polymerization.

In some embodiments, the polycarbonate resin may be a homopolycarbonate resin, a copolycarbonate resin, or a blend thereof. In addition, the polycarbonate resin may be partly or completely replaced by an aromatic polyester-carbonate resin obtained by polymerization in the presence of an ester precursor, for example, a bifunctional carboxylic acid.

In some embodiments, the polycarbonate resin may have a weight average molecular weight (Mw) of about 10,000 g/mol to about 50,000 g/mol, for example, about 15,000 g/mol to about 40,000 g/mol, as measured by gel permeation chromatography (GPC). Within this range, the thermoplastic resin composition can have good flowability (processability). In addition, the polycarbonate resin may be a mixture of at least two polycarbonate resins having different weight average molecular weights.

In some embodiments, the polycarbonate resin may have a melt-flow index (MI) of about 5 g/10 min to about 110 g/10 min, as measured at 300° C. under a load of 1.2 kgf in accordance with ISO 1133. Alternatively, the polycarbonate resin may be a mixture of at least two polycarbonate resins having different melt flow indexes.

(B) First Rubber-Modified Vinyl Graft Copolymer

The first rubber-modified vinyl graft copolymer according to the present invention serves to improve impact resistance and the like of the thermoplastic resin composition and may be a graft copolymer obtained through graft copolymerization of a monomer mixture including an aromatic vinyl monomer and a vinyl cyanide monomer to a rubber polymer. For example, the first rubber-modified vinyl graft copolymer may be obtained by graft polymerization of the monomer mixture including the aromatic vinyl monomer and the vinyl cyanide monomer to the rubber polymer, in which the monomer mixture may further include a monomer for imparting processability and heat resistance to the monomer mixture, as needed. Here, polymerization may be performed by any typical polymerization method, such as emulsion polymerization, suspension polymerization, and the like. In addition, the first rubber-modified vinyl graft copolymer may have a core (rubber polymer)-shell (copolymer of the monomer mixture) structure.

In some embodiments, the rubber polymer may include, for example, diene rubbers, such as polybutadiene, poly (styrene-butadiene), and poly(acrylonitrile-butadiene); saturated rubbers obtained by adding hydrogen to the diene rubbers; isoprene rubbers; $C_2$ to $C_{10}$ alkyl (meth)acrylate rubbers; copolymers of $C_2$ to $C_{10}$ alkyl (meth)acrylate and styrene; ethylene-propylene-diene monomer terpolymer (EPDM), and the like. These may be used alone or as a mixture thereof. For example, the rubber polymer may include diene rubbers and (meth)acrylate rubbers, specifically butadiene rubbers and butyl acrylate rubbers.

In some embodiments, the rubber polymer (rubber particle) may have an average particle diameter (D50) of about 0.05 μm to about 6 for example, about 0.15 μm to about 4 specifically about 0.25 μm to about 3.5 as measured by a particle size analyzer. Within this range, the thermoplastic resin composition can have good properties in terms of impact resistance, external appearance, and the like. Here, the average particle diameter can be measured by a drying method well-known in the art using a Mastersizer 2000E series analyzer (Malvern).

In some embodiments, the rubber polymer may be present in an amount of about 10% by weight (wt %) to about 70 wt %, for example, about 20 wt % to about 60 wt %, based on 100 wt % of the first rubber-modified vinyl graft copolymer, and the monomer mixture may be present in an amount of about 30 wt % to about 90 wt %, for example, about 40 wt % to about 80 wt %, based on 100 wt % of the first rubber-modified vinyl graft copolymer. Within this range, the thermoplastic resin composition can have good impact resistance.

In some embodiments, the aromatic vinyl monomer may be graft copolymerizable with the rubber polymer and may include, for example, styrene, α-methylstyrene, β-methylstyrene, p-methyl styrene, p-t-butylstyrene, ethyl styrene, vinylxylene, monochlorostyrene, dichlorostyrene, dibromostyrene, vinyl naphthalene, and the like. These may be used alone or as a mixture thereof. The aromatic vinyl monomer may be present in an amount of about 15 wt % to about 94 wt %, for example, about 20 wt % to about 80 wt %, based on 100 wt % of the monomer mixture. Within this range, the thermoplastic resin composition can have good processability and the like.

In some embodiments, the vinyl cyanide monomer is copolymerizable with the aromatic vinyl monomer, and may include, for example, acrylonitrile, methacrylonitrile, ethacrylonitrile, phenyl acrylonitrile, α-chloroacrylonitrile, fumaronitrile, and the like. These may be used alone or as a mixture thereof. For example, the vinyl cyanide monomer may include acrylonitrile, methacrylonitrile, and the like. The vinyl cyanide monomer may be present in an amount of about 6 wt % to about 85 wt %, for example, about 20 wt % to about 80 wt %, specifically about 20 wt % to about 60 wt %, based on 100 wt % of the monomer mixture. Within this range, the thermoplastic resin composition can have good properties in terms of flowability, stiffness, and the like.

In some embodiments, the monomer for imparting processability and heat resistance may include, for example, maleic anhydride, N-substituted maleimide, and the like. The monomer for imparting processability and heat resistance may be present in an amount of about 15 wt % or less, for example, about 0.1 wt % to about 10 wt %, based on 100 wt % of the monomer mixture. Within this range, the monomer for imparting processability and heat resistance can impart processability and heat resistance to the thermoplastic resin composition without deterioration in other properties.

In some embodiments, the first rubber-modified vinyl graft copolymer may include, for example, a g-ABS copolymer obtained by grafting styrene and acrylonitrile to a butadiene rubber polymer, and the like.

In some embodiments, the first rubber-modified vinyl graft copolymer may be present in an amount of about 1 part by weight to about 10 parts by weight, for example, about 1 part by weight to about 6 parts by weight, relative to about 100 parts by weight of the polycarbonate resin. If the content of the first rubber-modified vinyl graft copolymer is less than about 1 part by weight relative to about 100 parts by weight of the polycarbonate resin, the thermoplastic resin composition can suffer from deterioration in impact resistance and the like, and if the content of the first rubber-modified vinyl graft copolymer exceeds about 10 parts by weight, the thermoplastic resin composition can suffer from deterioration in flame retardancy, stiffness, flowability, and the like.

(C) Second Rubber-Modified Vinyl Graft Copolymer

The second rubber-modified vinyl graft copolymer according to the present invention serves to improve impact resistance and external appearance of the thermoplastic resin composition and may be a graft copolymer obtained through graft copolymerization of an alkyl (meth)acrylate monomer or a mixture of an alkyl (meth)acrylate monomer and an aromatic vinyl monomer to a rubber polymer. For example, the second rubber-modified vinyl graft copolymer may be obtained through graft copolymerization of the alkyl (meth)acrylate monomer or the mixture including the alkyl (meth)acrylate monomer and the aromatic vinyl monomer to the rubber polymer. Here, polymerization may be performed by any typical polymerization method, such as emulsion polymerization, suspension polymerization, and the like. In addition, the second rubber-modified vinyl graft copolymer may have a core (rubber polymer)-shell (polymer of the alkyl (meth)acrylate monomer or the monomer mixture) structure.

In some embodiments, the rubber polymer may include, for example, diene rubbers, such as polybutadiene, poly(styrene-butadiene), and poly(acrylonitrile-butadiene); saturated rubbers obtained by adding hydrogen to the diene rubbers; isoprene rubbers; $C_2$ to $C_{10}$ alkyl (meth)acrylate rubbers; copolymers of $C_2$ to $C_{10}$ alkyl (meth)acrylate and styrene; ethylene-propylene-diene monomer terpolymer (EPDM), and the like. These may be used alone or as a mixture thereof. For example, the rubber polymer may include diene rubbers and (meth)acrylate rubbers, specifically butadiene rubbers, ethyl acrylate rubbers, and combinations thereof.

In some embodiments, the rubber polymer (rubber particle) may have an average particle diameter (D50) of about 0.05 μm to about 6 μm, for example, about 0.15 μm to about 4 μm, specifically about 0.25 μm to about 3.5 μm, as measured by a particle size analyzer. Within this range, the thermoplastic resin composition can have good properties in terms of impact resistance, external appearance, and the like.

In some embodiments, the rubber polymer may be present in an amount of about 10 wt % to about 70 wt %, for example, about 20 wt % to about 60 wt %, based on 100 wt % of the second rubber-modified vinyl graft copolymer, and the alkyl (meth)acrylate monomer or the monomer mixture may be present in an amount of about 30 wt % to about 90 wt %, for example, about 40 wt % to about 80 wt %, based on 100 wt % of the second rubber-modified vinyl graft copolymer. Within this range, the thermoplastic resin composition can have good impact resistance.

In some embodiments, the alkyl (meth)acrylate monomer may be graft copolymerizable with the rubber polymer and may include, for example, methyl (meth)acrylate, ethyl (meth)acrylate, propyl (meth)acrylate, butyl (meth)acrylate, and the like. These may be used alone or as a mixture thereof. The alkyl (meth)acrylate monomer may be applied alone to a shell. When included in the monomer mixture, the alkyl (meth)acrylate monomer may be present in an amount of about 6 wt % to about 85 wt %, for example, about 20 wt % to about 80 wt %, specifically about 40 wt % to about 80 wt %, based on 100 wt % of the monomer mixture. Within this range, the thermoplastic resin composition can have good flowability, external appearance, and the like.

In some embodiments, the aromatic vinyl monomer may be graft copolymerizable with the rubber polymer and may include, for example, styrene, α-methylstyrene, β-methylstyrene, p-methyl styrene, p-t-butylstyrene, ethyl styrene, vinylxylene, monochlorostyrene, dichlorostyrene, dibromostyrene, vinyl naphthalene, and the like. These may be used alone or as a mixture thereof. The aromatic vinyl monomer may be present in an amount of about 15 wt % to about 94 wt %, for example, about 20 wt % to about 80 wt %, specifically about 20 wt % to about 60 wt %, based on 100 wt % of the monomer mixture. Within this range, the thermoplastic resin composition can have good processability and the like.

In some embodiments, the second rubber-modified vinyl graft copolymer may include, for example, a graft copolymer obtained through graft copolymerization of methyl methacrylate to a butadiene-based rubber polymer, a graft copolymer (g-MBS) obtained through graft copolymerization of methyl methacrylate and styrene to a butadiene-based rubber polymer, and the like.

In some embodiments, the second rubber-modified vinyl graft copolymer may be present in an amount of about 1 to about 10 parts by weight, for example, about 5 to about 9 parts by weight, relative to about 100 parts by weight of the polycarbonate resin. If the content of the second rubber-modified vinyl graft copolymer is less than about 1 part by weight relative to about 100 parts by weight of the polycarbonate resin, the thermoplastic resin composition can suffer from deterioration in impact resistance and the like, and if the content of the second rubber-modified vinyl graft copolymer exceeds about 10 parts by weight, the thermoplastic resin composition can suffer from deterioration in flame retardancy, external appearance, and the like.

In some embodiments, the first rubber-modified vinyl graft copolymer (B) and the second rubber-modified vinyl graft copolymer (C) may be present in a weight ratio ((B):(C)) of about 1:1 to about 1:3, for example, about 1:1.5 to about 1:2.5. Within this range, the thermoplastic resin composition can have further improved properties in terms of thin film flame retardancy, impact resistance, flowability, and balance therebetween.

(D) Phosphorus Flame Retardant

The phosphorus flame retardant according to one embodiment of the invention may include any typical phosphorus flame retardant used in typical thermoplastic resin compositions. For example, the phosphorus flame retardant may include a phosphate compound, a phosphonate compound, a phosphinate compound, a phosphine oxide compound, a phosphazene compound, and a metal salt thereof. These compounds may be used alone or as a mixture thereof.

In some embodiments, the phosphorus flame retardant may include an aromatic phosphoric ester compound (phosphate compound) represented by Formula 1.

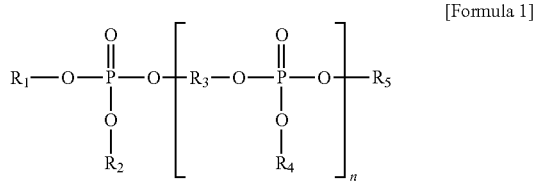

[Formula 1]

where $R_1$, $R_2$, $R_4$ and $R_5$ are each independently a hydrogen atom, a $C_6$ to $C_{20}$ aryl group, or a $C_1$ to $C_{10}$ alkyl group-substituted $C_6$ to $C_{20}$ aryl group; $R_3$ is a $C_6$ to $C_{20}$ arylene group or a $C_1$ to $C_{10}$ alkyl group-substituted $C_6$ to $C_{20}$ arylene group, for example, derivatives of a dialcohol, such as resorcinol, hydroquinone, bisphenol-A, or bisphenol-S; and n is an integer of 0 to 10, for example, 0 to 4.

When n is 0 in Formula 1, examples of the aromatic phosphoric ester compound may include diaryl phosphates such as diphenyl phosphate, triphenyl phosphate, tricresyl phosphate, trixylenyl phosphate, tri(2,6-dimethylphenyl) phosphate, tri(2,4,6-trimethylphenyl) phosphate, tri(2,4-di-tert-butylphenyl) phosphate, and tri(2,6-dimethylphenyl) phosphate; when n is 1 in Formula 1, examples of the aromatic phosphoric ester compound may include bisphenol-A bis(diphenyl phosphate), resorcinol bis(diphenyl phosphate), resorcinol bis[bis(2,6-dimethylphenyl)phosphate], resorcinol bis[bis(2,4-di-tert-butylphenyl) phosphate], hydroquinone bis[bis(2,6-dimethylphenyl)phosphate], hydroquinone bis(diphenyl phosphate), and hydroquinone bis[bis(2,4-di-tert-butylphenyl)phosphate]; and when n is 2 or more in Formula 1, the aromatic phosphoric ester compound may be an oligomer type phosphoric ester compound, without being limited thereto. These compounds may be used alone or as a mixture thereof.

In some embodiments, the phosphorus flame retardant may be present in an amount of about 1 part by weight to about 30 parts by weight, for example, about 5 parts by weight to about 20 parts by weight, relative to about 100 parts by weight of the polycarbonate resin. If the content of the phosphorus flame retardant is less than about 1 part by weight relative to about 100 parts by weight of the polycarbonate resin, the thermoplastic resin composition can suffer from deterioration in flame retardancy, flowability and the like, and if the content of the phosphorus flame retardant exceeds about 30 parts by weight, the thermoplastic resin composition can suffer from deterioration in heat resistance processability, and the like.

(E) Capsulated Fluorine Polymer

The capsulated fluorine polymer according to one embodiment of the invention serves to improve thin film flame retardancy, 5V flame retardancy and the like of the thermoplastic resin composition, and may include polytetrafluoroethylene (PTFE) capsulated with a polymer (SAN) of styrene and acrylonitrile, which is known as TSAN in the art.

In some embodiments, TSAN may include about 40 wt % to about 60 wt % of PTFE and about 40 wt % to about 60 wt % of SAN, in which SAN includes about 60 wt % to about 90 wt % of styrene and about 10 wt % to about 40 wt % of acrylonitrile.

In some embodiments, the capsulated fluorine polymer may be present in an amount of about 0.1 parts by weight to about 5 parts by weight, for example, about 0.5 parts by weight to about 3 parts by weight, relative to about 100 parts by weight of the polycarbonate resin. If the content of the capsulated fluorine polymer is less than about 0.1 parts by weight relative to about 100 parts by weight of the polycarbonate resin, the resin composition can suffer from deterioration in thin film flame retardancy and the like, and if the content of the capsulated fluorine polymer exceeds about 5 parts by weight, the resin composition can suffer from deterioration in flowability, external appearance, and the like.

The thermoplastic resin composition according to one embodiment of the invention may further include additives used for typical thermoplastic resin compositions. Examples of the additives may include fillers, antioxidants, lubricants, release agents, nucleating agents, stabilizers, pigments, dyes, and mixtures thereof, without being limited thereto. The additives may be present in an amount of about 0.001 parts by weight to about 40 parts by weight, for example, about 0.1 parts by weight to about 10 parts by weight, relative to about 100 parts by weight of the polycarbonate resin.

The thermoplastic resin composition according to one embodiment of the invention may be prepared in pellet form by mixing the aforementioned components, followed by melt extrusion at about 200° C. to about 280° C., for example, about 220° C. to about 260° C., using a typical twin-screw extruder.

In some embodiments, the thermoplastic resin composition may have a notched Izod impact strength of about 45 kgf·cm/cm to about 80 kgf cm/cm, for example, about 50 kgf·cm/cm to about 75 kgf·cm/cm, as measured on a ⅛" thick specimen in accordance with ASTM D256.

In some embodiments, the thermoplastic resin composition may have a flame retardancy of V0 or higher, as measured on a 1.2 mm thick specimen by a UL-94 vertical test method.

In some embodiments, the thermoplastic resin composition may have a flame retardancy of 5VA, as measured on a 2.5 mm thick specimen by a UL-94 vertical test method.

In some embodiments, the thermoplastic resin composition may have a Vicat softening temperature of about 90° C. to about 120° C., for example, about 95° C. to about 110° C., as measured under conditions of a load of 5 kg and 50° C./hr in accordance with ISO R306.

In some embodiments, the thermoplastic resin composition may have a melt-flow index (MI) of about 10 g/10 min to about 60 g/10 min, for example, about 20 g/10 min to about 50 g/10 min, as measured under conditions of 220° C. and 10 kgf in accordance with ASTM D1238.

A molded product according to the present invention is formed of the thermoplastic resin composition set forth above. The thermoplastic resin composition may be prepared in pellet form. The prepared pellets may be produced into various molded products (articles) by various molding methods, such as injection molding, extrusion molding, vacuum molding, and casting. These molding methods are well known to those skilled in the art. The molded product has good properties in terms of impact resistance, thin film flame retardancy, heat resistance, flowability, and the like, and thus can be advantageously used for exterior materials for thin film type (thickness: about 1 mm to about 3 mm) electrical/electronic products. In addition, the molded product is applicable to housings of vending machines and industrial drives that require 5VA certification.

MODE FOR INVENTION

Next, the present invention will be described in more detail with reference to some examples. It should be understood that these examples are provided for illustration only and are not to be in any way construed as limiting the invention.

EXAMPLE

Details of components used in Examples and Comparative Examples are as follows:

(A) Thermoplastic Resin (A1) A bisphenol-A type polycarbonate resin having a weight average molecular weight (Mw) of 18,000 g/mol was used.

(A2) A bisphenol-A type polycarbonate resin having a weight average molecular weight (Mw) of 25,000 g/mol was used.

(B) First Rubber-Modified Vinyl Graft Copolymer g-ABS prepared by graft copolymerization of 55 wt % of styrene and acrylonitrile (weight ratio: 75/25) to 45 wt % of butadiene rubber (average particle diameter: 310 nm) was used.

(C) Second Rubber-Modified Vinyl Graft Copolymer

A rubber-modified vinyl graft copolymer (Manufacturer: Kureha, Product Name: EXL-2602) having a core-shell structure obtained by graft copolymerization of methyl methacrylate (shell) to butadiene/ethyl acrylate rubber (core, average particle diameter: 310 nm) was used.

(D) Phosphorus Flame Retardant

Hydroquinone bis(diphenyl phosphate) (Manufacturer: ICL-IP, Product Name: Sol-DP) was used.

(E1) Capsulated Fluorine Polymer

TSAN, that is, polytetrafluoroethylene (PTFE) capsulated with a polymer (SAN) of styrene and acrylonitrile (Manufacturer: Hannanotech, Product Name: FS-200), was used.

(E2) Anti-Dripping Agent

Polytetrafluoroethylene (PTFE, Manufacturer: Asahi Glass, Product Name: G350) was used.

Examples 1 to 4 and Comparative Examples 1 to 3

The aforementioned components were mixed in amounts as listed in Table 1, followed by extrusion at 230° C., thereby preparing a thermoplastic resin composition in pellet form. Here, extrusion was performed using a twin-screw extruder (L/D: 36, Φ: 45 mm). The prepared pellets were dried at 80° C. for 2 hours or more and then subjected to injection molding using a 6 oz. injection machine (molding temperature: 230° C., mold temperature: 60° C.), thereby preparing a specimen. The prepared specimen was evaluated as to the following properties. Results are shown in Table 1.

Property Evaluation (1) Impact resistance: Notched Izod impact strength (unit: kgf·cm/cm) was measured on a ⅛" thick notched Izod specimen in accordance with ASTM D256.

(2) Flame retardancy: Flame retardancy was measured using 1.2 mm and 2.5 mm thick specimens in accordance with the UL 94 vertical test standard.

(3) Heat resistance: Vicat Softening Temperature (VST) (unit: ° C.) was measured under conditions of a load of 5 kg and 50° C./hr in accordance with ISO R306.

(4) Flowability: Melt-flow Index (MI) (unit: g/10 min) was measured under conditions of 220° C. and 10 kgf in accordance with ASTM D1238.

TABLE 1

| | | Example | | | | Comparative Example | | |
|---|---|---|---|---|---|---|---|---|
| | | 1 | 2 | 3 | 4 | 1 | 2 | 3 |
| (A) | (A1) | 25 | 50 | 75 | 50 | 50 | 50 | 50 |
| (wt %) | (A2) | 75 | 50 | 25 | 50 | 50 | 50 | 50 |
| (B) (parts by weight) | | 3.8 | 3.8 | 3.8 | 3.8 | 3.8 | 3.8 | 3.8 |
| (C) (parts by weight) | | 7.5 | 7.5 | 7.5 | 7.5 | 7.5 | 0.5 | 12 |
| (D) (parts by weight) | | 12.5 | 12.5 | 12.5 | 12.5 | 12.5 | 12.5 | 12.5 |
| (E1) (parts by weight) | | 1.3 | 1.3 | 1.3 | 1.3 | — | 1.3 | 1.3 |
| (E2) (parts by weight) | | — | — | — | — | 1.3 | — | — |
| Notched Izod strength (kgf · cm/cm) | | 70 | 60 | 55 | 60 | 15 | 10 | 70 |
| Flame retardancy (1.2 mm) | | V-0 | V-0 | V-0 | V-0 | V-0 | V-0 | Fail |
| Flame retardancy (2.5 mm) | | 5VA | 5VA | 5VA | 5VA | 5VA | 5VA | Fail |
| VST (° C.) | | 101 | 101 | 100 | 101 | 101 | 103 | 98 |
| MI (g/10 min) | | 20 | 30 | 40 | 30 | 22 | 35 | 25 |

*parts by weight: parts by weight relative to 100 parts by weight of thermoplastic resin (A)

From the results, it could be seen that the thermoplastic resin composition according to the present invention had good properties in terms of impact resistance, thin film flame retardancy, heat resistance, flowability, and the like.

Conversely, it could be seen that the composition of Comparative Example 1 prepared using PTFE instead of the capsulated fluorine polymer (TSAN) suffered from deterioration in impact resistance and the like. It could be seen that the composition of Comparative Example 2 prepared using an insufficient amount of the second rubber-modified vinyl graft copolymer suffered from deterioration in impact resistance and the like and the composition of Comparative Example 3 prepared using an excess of the second rubber-modified vinyl graft copolymer could not realize flame retardancy.

It should be understood that various modifications, changes, alterations, and equivalent embodiments can be made by those skilled in the art without departing from the spirit and scope of the invention.

The invention claimed is:

1. A thermoplastic resin composition comprising:
   about 100 parts by weight of a polycarbonate resin;
   about 1 part by weight to about 10 parts by weight of a first rubber-modified vinyl graft copolymer obtained through graft polymerization of a monomer mixture comprising an aromatic vinyl monomer and a vinyl cyanide monomer to a rubber polymer, wherein the rubber polymer of the first rubber-modified vinyl graft copolymer is present in an amount of 20 wt % to 60 wt % based on 100 wt % of the first rubber-modified vinyl graft copolymer, wherein the first rubber-modified vinyl graft copolymer is a g-ABS copolymer obtained by grafting styrene and acrylonitrile to a butadiene rubber polymer and has a butadiene rubber polymer core-styrene-acrylonitrile copolymer shell, wherein the first rubber-modified vinyl graft copolymer is obtained through emulsion polymerization;

about 1 part by weight to about 10 parts by weight of a second rubber-modified vinyl graft copolymer obtained through graft polymerization of an alkyl (meth)acrylate monomer to a rubber polymer;

about 1 part by weight to about 30 parts by weight of a phosphorus flame retardant, wherein the phosphorus flame retardant is hydroquinone bis(diphenyl phosphate); and about 0.1 parts by weight to about 5 parts by weight of a capsulated fluorine polymer, wherein the first rubber-modified vinyl graft copolymer and the second rubber-modified vinyl graft copolymer are present in a weight ratio of 1:1.5 to 1:2.5, and wherein the thermoplastic resin composition has a notched Izod impact strength of 55 kgf·cm/cm to about 80 kgf·cm/cm, as measured on a ⅛" thick specimen in accordance with ASTM D256; a flame retardancy of V-0 or higher, as measured on a 1.2 mm thick specimen by a UL-94 vertical test method; a flame retardancy of 5VA, as measured on a 2.5 mm thick specimen by a UL-94 vertical test method; a Vicat softening temperature of about 90° C. to about 120° C., as measured under conditions of a load of 5 kg and 50° C./hr in accordance with ISO R306, and a melt-flow index (MI) of about 20 g/10 min to about 50 g/10 min, as measured under conditions of 220° C. and 10 kgf in accordance with ASTM D1238.

2. The thermoplastic resin composition according to claim 1, wherein the second rubber-modified vinyl graft copolymer is obtained through graft polymerization of a monomer mixture comprising the alkyl (meth)acrylate monomer and an aromatic vinyl monomer to the rubber polymer.

3. The thermoplastic resin composition according to claim 1, wherein the capsulated fluorine polymer is polytetrafluoroethylene capsulated with a polymer of styrene and acrylonitrile.

4. A molded product formed of the thermoplastic resin composition according to claim 1.

5. The thermoplastic resin composition according to claim 1, comprising about 1 part by weight to 7.5 parts by weight of the second rubber-modified vinyl graft copolymer obtained through graft polymerization of an alkyl (meth) acrylate monomer to a rubber polymer.

* * * * *